United States Patent [19]

Bates et al.

[11] 3,836,784

[45] Sept. 17, 1974

[54] ACTIVATED IODIDE X-RAY IMAGE INTENSIFIER SCREEN

[76] Inventors: Clayton W. Bates, 755 Rhode Island St., San Francisco, Calif. 94107; Richard A. Wallace, 43 Kingcote Gardens, Stanford, Calif. 94305

[22] Filed: Mar. 6, 1973

[21] Appl. No.: 338,500

[52] U.S. Cl. ............................................. 250/483
[51] Int. Cl. .............................................. H01j 1/62
[58] Field of Search ........... 250/483, 486, 487, 488, 250/458, 459, 460, 361, 362

[56] References Cited
UNITED STATES PATENTS
2,851,612  9/1958  Davey ................................ 250/483
3,023,313  2/1962  DeLamater et al. ............ 250/486 X
3,296,448  1/1967  Swinehart et al. .................. 250/483

Primary Examiner—Archie R. Borchelt

[57] ABSTRACT

X-ray image intensifier screens are provided having a thin film of activated iodide phosphor in a polyfluorinated, polymeric binder. The greatly enhanced response of the activated iodide phosphor greatly reduces X-ray dosages to patients as compared to present X-ray dosages employing calcium tungstate as the luminescent material.

10 Claims, 2 Drawing Figures

PATENTED SEP 17 1974 3,836,784
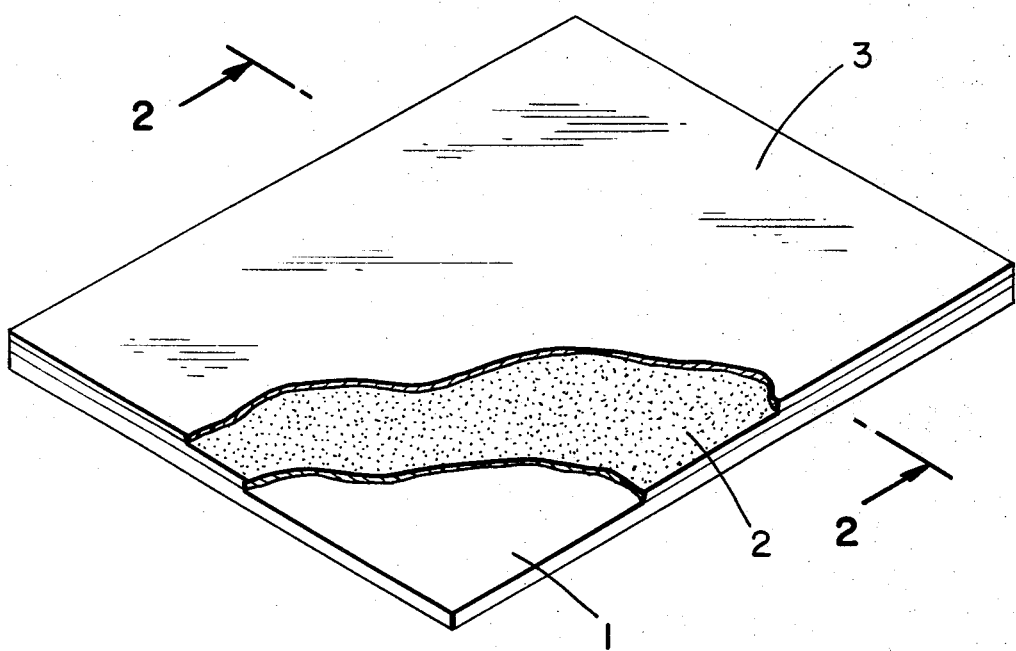
FIG_1
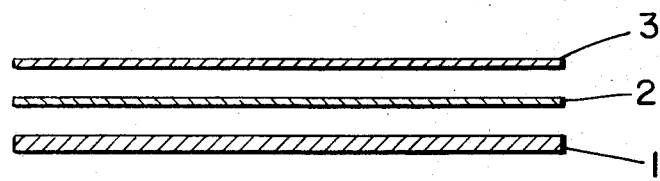
FIG_2

ACTIVATED IODIDE X-RAY IMAGE INTENSIFIER SCREEN

BACKGROUND OF THE INVENTION

1. Field of the Invention

Under X-ray excitation, in the 40–100 kilovolt range, activated iodide phosphors, e.g. sodium activated cesium iodide (CsI(Na)), is an efficient luminescent material, the peak in the X-ray fluorescent spectra occurring at 4,200 A. The emission at 4,200 A is the perfect match for presently available radiographic film and its X-ray absorption coefficient is approximately twice that of calcium tungstate over the 40–100 kilovolt range; calcium tungstate is the presently commercially used material for X-ray image intensifier screens. In addition, sodium activated cesium iodide has a conversion efficiency which is three times that of calcium tungstate at 4,200 A.

Unlike calcium tungstate, activated iodide phosphors are extremely hygroscopic. Absorption of small amounts of water rapidly reduces the conversion efficiency to a vanishingly small value. In order to employ activated iodide phosphors it is therefore necessary to provide the activated iodide phosphor in the screen in a form in which it remains stable for long periods of time.

Various ways have been taught for using thallium activated potassium iodide and protecting the iodide from moisture.

2. Description of the Prior Art

U.S. Pat. Nos. 2,853,621, 2,986,725, 3,023,313, 3,089,956, 3,147,226, 3,389,255, 3,473,066 and 3,499,150 describe X-ray image intensifier screens. U.S. Pat. Nos. 2,727,683 and 3,030,313 describe activated alkali metal iodide phosphors.

BRIEF DESCRIPTION OF THE SEVERAL VIEWS OF THE DRAWINGS

FIG. 1 is a perspective view of an intensifying screen partially cut away.

FIG. 2 is a vertical section taken along line 2—2 in FIG. 1, the elements being shown separated.

SUMMARY OF THE INVENTION

X-ray image intensifier screens are provided having a thin layer of activated iodide phosphor particles on the average in the 1 to 20 micron range, suspended in a polyfluorinated-noncrystalline binder as a film having a thickness of from about 2 to 10 mils. The film is employed in conjunction with a reflective backing, when used as a screen.

DESCRIPTION OF THE SPECIFIC EMBODIMENTS

X-ray image intensifier screens are provided employing activated iodide phosphors, particularly sodium activated cesium iodide, as the luminescent material. Because of the extreme difficulty in protecting sodium activated cesium iodide from moisture, it will be discussed as exemplary. Small dry particles of sodium activated cesium iodide are formed and uniformly suspended in a liquid polyfluorinated polymeric material, normally as a solution, in an amount sufficient to provide a final product having a bulk density in the range of about 50 to 80 percent. The liquid mixture is then formed as a film of from about 2 to 10 mils, solvent rapidly evaporated, and the polymeric binder quenched, so as to pass through its glass transition temperature without crystallizing. The resulting film can be used in X-ray image intensifier screens, being stable for long periods of time.

Various addition homo- and copolymers, having geminal fluorine groups, can be used in the invention. The monomers which find use will, for the most part, have the following formula;

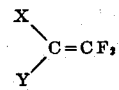

wherein $X$ and $Y$ are the same or different and are hydrogen, fluorine or chlorine (halogen of atomic number 9 to 17). Preferably $X$ is fluorine and $Y$ is chlorine. Preferred polymers are those having at least 50, usually at least 60 number percent of trifluorochloroethylene as monomer. Illustrative polymers include polychlorotrifluoroethylene, copolymer of chlorotrifluoroethylene and vinylidene fluoride (75:25) and the like.

In preparing the sodium activated cesium iodide, cesium iodide is dissolved in a convenient solvent, usually a methanolic solvent, with a small amount of sodium iodide. Per 100 parts of cesium iodide, the amount of sodium iodide can vary over a wide range, ranging from 0.005 to 10 parts, more usually from about 0.1 part to 5 parts, preferably 0.5 part to 2 parts. The iodide salts are dissolved in a minimum amount of solvent, with agitation and heating as required, and the sodium activated cesium iodide then precipitated. Precipitation can be induced by cooling or addition of a non-solvent, e.g. adding isopropanol to water or methanol or mixture thereof. The resulting crystals should have an average size in the range of 1 to 20 microns, more usually 2 to 10 microns, preferably about 5 microns, with about 90 weight percent of the particles within about 50 percent of the average size. The crystals are isolated and dried, and should be used in the substantial absence of water vapor.

The polyvinylidene fluoride polymer is dissolved at an elevated temperature in a convenient solvent. Various solvents can be employed which are substantially immiscible with water. Illustrative solvents are polyhalogenated solvents such as chlorofluorocarbon and fluorocarbon oils, ketones of from five to 10 carbon atoms, and the like. Of particular interest are methyl isobutyl ketone and diisobutyl ketone.

If desired, the sodium activated cesium iodide particles can be produced with a thin layer of glass-like materials such as titanium dioxide or silicon dioxide by soaking the particles in a bath having the appropriate tetrachloride (Si or Ti) in ethanol.

The polymer will normally be present in the solvent in at least 5 weight percent and may be present in amounts as high as 30 weight percent, preferably in the range of 5 to 15 weight percent. A minimum amount of solvent is desirable, which allows for a reasonable viscosity, so as to permit satisfactory agitation and uniform distribution of the sodium activated cesium iodide crystals in the solution.

While protecting the solution from moisture, the crystals are added to the solution, in an amount sufficient to provide from 50 to 80 weight percent, preferably from 70 to 80 weight percent based on polymer-sodium activated cesium iodide composition. The addition is carried out in a dry inert atmosphere. The solution is rapidly stirred to insure uniform distribution of the sodium activated cesium iodide crystals.

The solution may now be used to prepare a film of the sodium activated cesium iodide in the polymeric binder. Conventional techniques can be employed, such as draw down, casting and the like. The temperature of the polymeric film should be rapidly quenched, either at the time of forming the film, or subsequently, by heating the film above the glass transition temperature and rapidly cooling it to below the glass transition temperature. In this way, high optical clarity for the film can be achieved.

The film is formed onto a clean substrate or supporting sheet. Any number of materials can be used for the supporting sheet such as cardboard, plastic, glass or the like. Usually, a reflective sheet or coating will be employed as a facing between the substrate and the phosphor-binder coating. A thin sheet of aluminum foil, e.g 0.5 to 2 mil thickness or a titanium dioxide doped binder, e.g. cellulose butyrate, can be employed. Bonding between the various sheets is usually satisfactory without auxiliary additives.

The film will normally be formed in a thickness of from about 2 to 10 mils, more usually from about 4 to 7 mils. The film may now be used in a conventional X-ray image intensifier screen and will be stable for long periods of time, providing the ample advantages achieved by employing sodium activated cesium iodide in place of the conventional calcium tungstate.

In addition to the sodium activated cesium iodide, other materials may be included in the fluorocarbon binder. Pigments may be added to enhance resolution, e.g. titanium dioxide and zirconium dioxide. The amount of pigment will generally be in the range of 0 to 10 weight percent based on the phosphor. Small amounts of stabilizers may be included, such as sodium or potassium thiosulfate. If desired, a thin coating or film of from 0.5 to 1 mil may be placed over the phosphor sheet to provide further protection.

The composite X-ray image intensifier may then be combined with an emulsion film to provide the package for use in X-ray photography. The composite is usually held in a casette for direct introduction into the X-ray apparatus.

The intensifier screen is depicted in FIGS. 1 and 2. Onto a substrate or supporting sheet 1 is employed a reflective sheet or coating 2. Bonded to the reflective sheet or coating 2 is the activated phosphor containing film 3.

A film can be prepared as follows: 100 g of cesium iodide and 1 g of sodium iodide are dissolved in 100 ml of water (70° – 100°C). The mixture is vigorously stirred. Upon cooling, crystals develop which precipitate out, having a size of about 5 microns on the average. The solution is filtered, while protecting the crystals from moisture and the crystals dried.

Twenty grams of polychlorotrifluoroethylene or a 75:25 copolymer of chlorotrifluoroethylene and vinylidene fluoride (mol.wt. $1 - 2.5 \times 10^5$ weight average) are dissolved in 200 ml of diisobutyl ketone at an elevated temperature. When the solution is completely homogeneous, 75 g of the sodium activated cesium iodide prepared as described above is rapidly added to the solution with vigorous stirring. When the crystals are substantially uniformly distributed in the solution, the solution is cast onto a smooth surface and drawn down to a film of about 5 mils with a doctor blade. The resulting film is allowed to air dry for about two hours in a dry atmosphere, followed by heating in an oven at about 180°C for about three hours. When most of the solvent is removed, the film is then heated to about 225°C for about 0.5 hours, followed by cooling. In addition, the film may be annealed by being heated above its glass transition temperature to above 100°C, and then rapidly cooled to below 50°C, to provide a film of optical clarity.

In accordance with this invention, sodium activated cesium iodide or other activated iodide phosphors, e.g. thallium activated, is provided in a film of a polyvinylidene fluoride having at least 50 number percent of a perhalogenated monomer (halogen of atomic number 9 to 17) for use in X-ray image intensifier screens. By employing the activated iodide phosphors in place of the conventionally used calcium tungstate, substantial advantages are obtained. Sodium activated cesium iodide has about twice as great an absorption coefficient over the 40–100 kilovolt range than the calcium tungstate, as well as a threefold greater conversion efficiency. The film has high optical clarity, is extremely stable, being inert to most chemical environments, and is easily formed as a film and handled. The films of this invention are stable for long periods of time, so that they can be stored under a wide variety of conditions, without losing the optical clarity and desirable luminescent properties.

The foregoing invention has been described in some detail by way of illustration and example for purposes of clarity of understanding, it will be obvious that certain changes and modifications may be practiced within the scope of the invention, as limited only by the scope of the appended claims.

What is claimed is:

1. An X-ray image intensifier screen comprising a thin film of a polyvinylidene fluoride polymer wherein at least 50 number percent of the monomer is perhalogenated with halogen of atomic number 9 to 17, having activated iodide phosphor crystals substantially uniformly distributed therein, in at least 60 weight percent based on said film.

2. A screen according to claim 1, wherein said polymer is polytrichlorofluoroethylene.

3. A screen according to claim 1, wherein said polymer is a copolymer of vinylidene fluoride and chlorotrifluoroethylene.

4. A screen according to claim 1, wherein said film is of from about 2 to 10 mils in thickness, and said crystals are on the average of from about 1 to 20 microns.

5. A screen according to claim 1, wherein said film is of from about 4 to 7 mils in thickness, and said crystals are of about 5 microns on the average.

6. A film for use in an X-ray image intensifier screen of from about 2 to 10 mils thickness comprising at least 60 weight percent of sodium activated cesium iodide crystals of a size on the average in the range of about 1 to 20 microns and a polyvinylidene fluoride polymer as the binder having at least 60 number percent of chlorotrifluoroethylene monomer.

7. A film according to claim 6, wherein said crystals are on the average of a size in the range of about 2 to 10 microns.

8. An X-ray image intensifier screen comprising a film of from about 4 to 7 mils average thickness of polyvinylidene fluoride polymer having at least 60 number percent of a perhalogenated monomer of halogen of atomic number 9 to 17 and having from about 60 to 80 weight percent of sodium activated cesium iodide crystals of a size in the range of about 1 to 20 microns, substantially uniformly distributed therein, said film being bonded to a stable substrate.

9. A screen according to claim 8, having a coating intermediate said film and substrate of an opaque reflective material.

10. A screen according to claim 9, wherein said coating is aluminum film of about 0.5 to 2 mils in thickness.

* * * * *